United States Patent
Ashin

(10) Patent No.: US 7,134,213 B1
(45) Date of Patent: Nov. 14, 2006

(54) MAGIC COMPASS

(76) Inventor: Mark Alan Ashin, P.O. Box 43213 Har Nof, Jerusalem (IL) 91431

( * ) Notice: Subject to any disclaimer, the term of this patent is extended or adjusted under 35 U.S.C. 154(b) by 127 days.

(21) Appl. No.: 11/044,823

(22) Filed: Jan. 28, 2005

(51) Int. Cl.
*G01C 17/28* (2006.01)

(52) U.S. Cl. .................... 33/355 R; 33/349; 33/361; 33/1 CC

(58) Field of Classification Search ............ 33/355 R, 33/361, 316, 320, 1 CC
See application file for complete search history.

(56) References Cited

U.S. PATENT DOCUMENTS

| | | | | |
|---|---|---|---|---|
| 3,950,859 | A | * | 4/1976 | Kramer .................... 33/352 |
| 4,175,333 | A | * | 11/1979 | Kramer .................... 33/344 |
| 4,438,568 | A | * | 3/1984 | Kramer et al. ............ 33/348 |
| 4,980,644 | A | * | 12/1990 | Todorov .................... 324/345 |
| 5,146,687 | A | * | 9/1992 | Kjellstrom ................ 33/355 R |
| 5,367,781 | A | * | 11/1994 | Hsu .......................... 33/349 |
| 5,546,310 | A | | 8/1996 | Ehdaie |
| 5,721,713 | A | | 2/1998 | Bornand |
| 5,755,036 | A | * | 5/1998 | Lewis ........................ 33/355 R |
| 5,790,477 | A | | 8/1998 | Hauke |
| 6,185,157 | B1 | | 2/2001 | Farine |
| 6,516,526 | B1 | * | 2/2003 | Iden .......................... 33/355 R |
| 6,973,732 | B1 | * | 12/2005 | Chang ....................... 33/355 R |
| 2002/0162234 | A1 | * | 11/2002 | Ashin ........................ 33/349 |

FOREIGN PATENT DOCUMENTS

| | | |
|---|---|---|
| CH | 607904 | 4/1978 |
| CH | 613832 | 10/1979 |
| DE | 3412777 A1 | 10/1985 |
| EP | 60814 | 9/1982 |

* cited by examiner

*Primary Examiner*—Yaritza Guadalupe-McCall

(57) ABSTRACT

A magic compass that gives the illusion it defies the laws of nature, providing usage as an aid for locating the direction of prayer as well as a novel promotional device for companies, having a magnetized compass needle (16) which is attached via a linking means to a non-magnetic pointer (22). This linking means, which can be rigid (11) or non-rigid (29), allows the non-magnetic pointer (22) to be angularly displaced from the magnetized compass needle (16). This linkage also provides the means for the non-magnetic pointer (22) to rotate and pivot freely via the inertia of the magnetized needle (16). A partition (20) hides the magnetized needle (16) below, and simultaneously creates a compass face for the non-magnetic pointer above. The non-magnetic pointer (22) is designed and shaped to appear identical to a true magnetized compass needle (32).

12 Claims, 3 Drawing Sheets

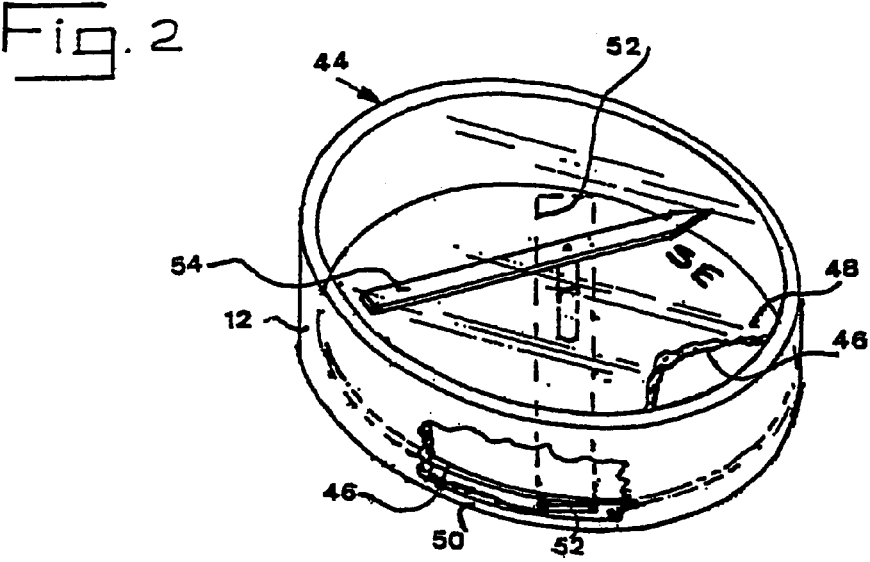
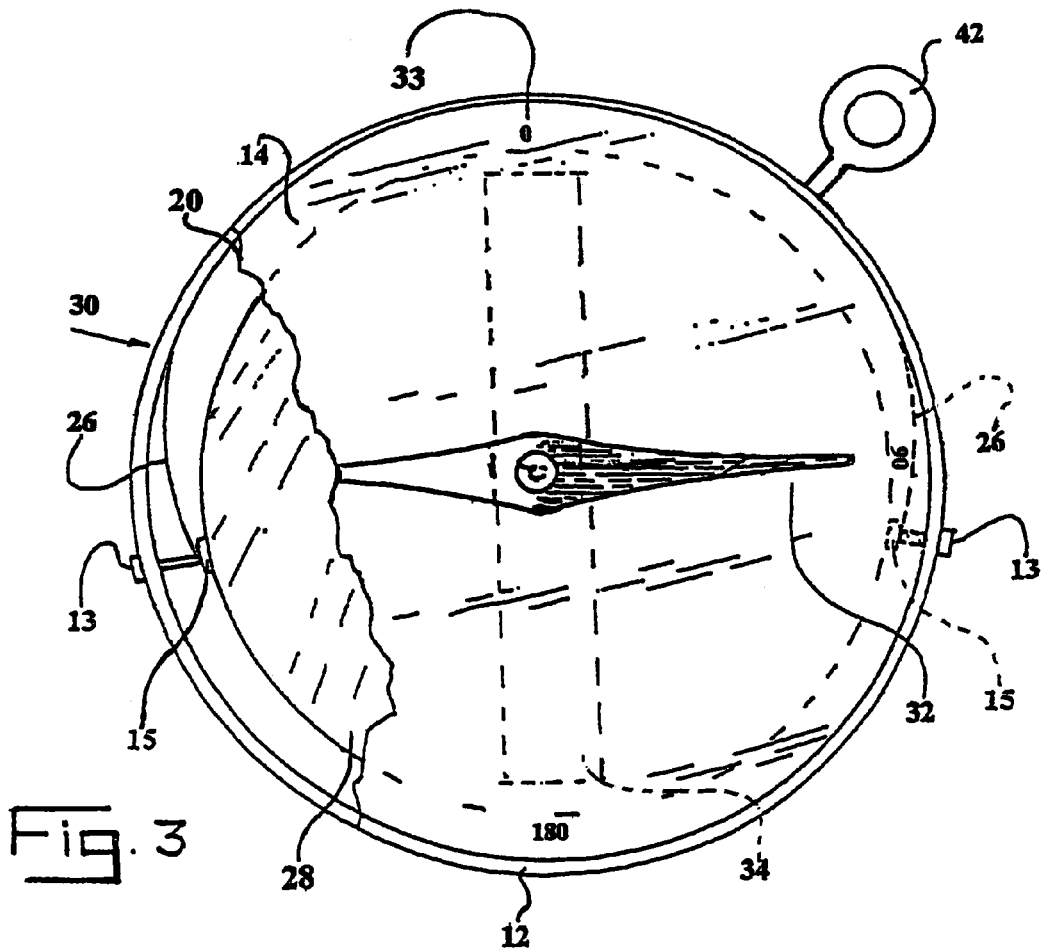

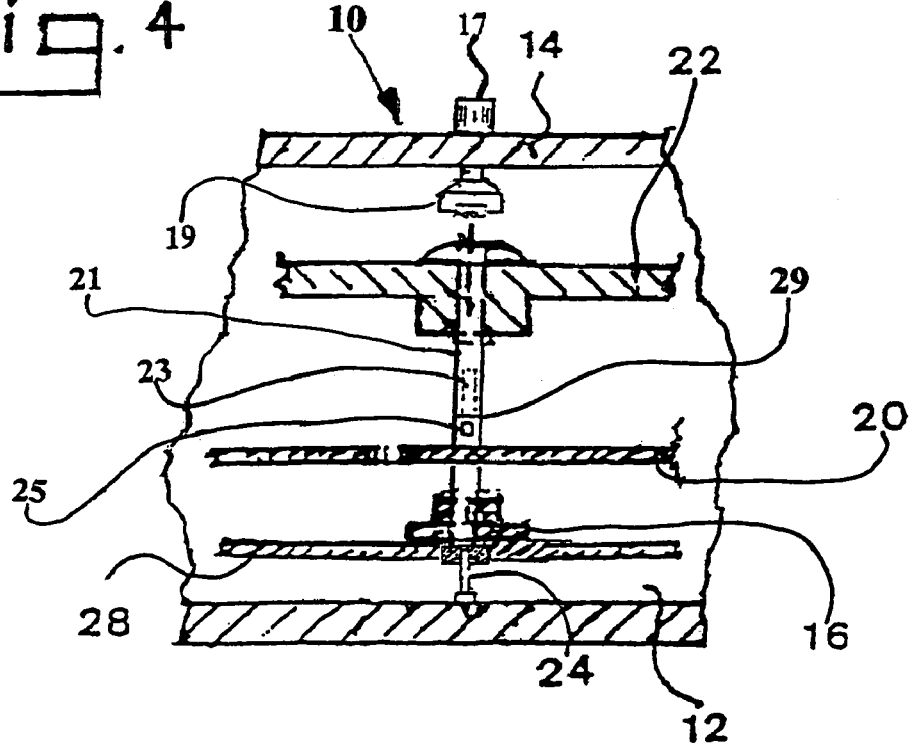

MAGIC COMPASS

This invention relates to a magnetic north-pointing compass, specifically to the generic compass of known type which is readily available in all camping, hobby, and toy stores.

BACKGROUND OF THE INVENTION

We are all aware of the industry, which is comprised of magicians and their magic tricks. Magic is an age-old art, which can be traced back to time immemorial. In the New Webster's Dictionary, magic is defined as: ("The feigned art of influencing nature or events by occult means; sorcery; charm.") A magician is defined as: ("one skilled in magic; a conjurer.")

One of the most famous magicians of the past century was Harry Houdini. He was famous for his ability to escape from almost any situation. In fact he received a U.S. patent in 1921, U.S. Pat. No. 1,370,316, for a special diving suit. From this suit he was able to escape while handcuffed, chained and submerged in water. There is a vast array of special equipment, which enables the magician to perform his magic tricks. These tricks consist of normal everyday items that have been modified in a hidden way not visible to the human eye, in order to give the impression or illusion to the viewer, that magic, i.e. a process that defies and goes against the laws of nature, is taking place. Another term for this magical process is "sleight of hand". In the Webster's Dictionary, "sleight of hand" is defined as: "artful trick, skill of hand." In other words, we know that there really isn't any "magic" taking place, but we are not able to see how the magician seemingly manipulated the laws of nature. We are left with the mystery of the illusion.

The present invention relates to a compass that instead of being bound by the laws of physics to point only North, can be manufactured in a specific manner to give the illusion that it defies the laws of nature, and can "magically" point in any "other" direction. These "other" directions are for the purpose of the illusion, and not necessarily to specify a specific geographic location. This invention is useful for the entertainment industry that is comprised of magicians, and magic trick manufacturers.

In its other embodiments, my invention will also provide an important usage as a unique promotional aid for companies, a new item for the industries of souvenir and greeting card manufacturers, and a very special device for the worshippers of those religions who need to face in a specific geographic direction when praying. As will be explained further on, there is no limitation to the usefulness of this device due to its novelty.

This invention in its most preferred embodiment has usefulness to the magician trade to portray the art of magic by means of the "slight of hand" techniques practiced by professional magicians. In an example of this technique, the magician would display a generic compass of known type, and show how it follows the laws of physics by always re-aligning itself with the magnetic north pole. During this display, the magician would use the "slight of hand" technique and substitute the north-pointing compass with my magic compass, which will appear identical to the first compass in size and design. He would then display how the compass is no longer bound by the laws of physics and is now pointing in another direction, yet continuing to function like a normal compass. The magician has now proven that he has manipulated the laws of nature.

Another purpose of my invention is to supply a very unique item, which due to its novelty and mystery, will be purchased by companies, and organizations for promotional usages. All companies are in need of promotional gadgets that will bring attention to their company and their products or services. The most well known item in usage today as a promotional tool is the ink pen. Pens that are stamped with the company's name and logo are distributed freely to its customers and business affiliates. Unfortunately, a pen has no novelty, and when the ink is used up, the pen is discarded along with the company's logo. My invention will supply the most original and unique promotional item for these companies and corporations. For example, the South Trust Bank will wish to give to its patrons, a miniature "South Trust Bank Compass" which always points South, i.e. the direction which is the name of the Bank. Such a compass, containing the Bank's emblem embossed on its face, and seemingly defying the laws of nature by always pointing South, shows that the South Trust Bank gives service that is beyond the level of nature. This invention, through its combination of attributes, i.e., a) a compass—being a useful instrument, b) its novelty—by seemingly defying the laws of nature and pointing in the direction of the bank, and by c) attaching it to a key chain, which will enable it to be carried everywhere by the patron, will make my invention the most effective promotional device. Also, unlike a pen, it will never be "used up" and discarded. Another example would be for the Southern Comfort Co. to attach a miniature Southern Comfort Compass on the bottle cap of its whiskey thereby portraying that just as their product surpasses nature in its quality, and taste, they have a very special compass that is compelled to follow suit by pointing South, which is the global direction that is related to the name of their company. In both of the above examples, the direction South is not indicative of a geographic destination, but only to the name of the company as is relevant in advertising.

Another usage for this magic compass is as a novelty item to be introduced to the Greeting Card Industry for a new line of greeting cards. For example, a very small inexpensive model of a compass pointing South would be embedded into the card with the following poem: "When thinking of you, I bought a compass . . . to point me in the right direction, but wonders of wonders the laws of mother nature are broken, the cause must have been my affection." Here we demonstrate how one's affection is so strong that even his compass is affected and acts in a way that is beyond nature. Another example for the Greeting Card Industry would be a compass designed to point South with the following poem: "This compass card that I bought for you has changed mother nature's pattern, instead of pointing "N" for North, it now points "S" for Saturn." This new "magic compass greeting card" will supply the industry with a very special new line of cards, and the purchaser will receive a very unusual gift along with his card. An appropriate poem will accompany the card as is relevant to the direction that the compass is pointing. Of course, a variety of cards would be manufactured to cover the entire spectrum of holidays and birthdays etc.

In the last two examples, my invention finds usage as a very powerful promotional item and in the last example, a new line of greeting cards for the billion-dollar greeting card industry.

Another usage for my magic compass would be as a unique souvenir. Throughout the world, wherever travelers and tourists go, there are stores selling souvenirs, which are designed to serve as a memorable to the place that the tourist has visited. An example of this is a T-shirt with the name of the country or state printed on it. Sometimes we have seen pencils and other items carrying the name of the country or place that the tourist has visited. My invention will add a very unique souvenir item to these stores, which are located at highway stops, national parks or museums. For example; someone driving across country from the East coast to the West, would be very happy to by a souvenir called the "Wild Wild West" Compass. The store owner has provided a very unique souvenir which contains novelty by virtue of its "defying the laws of nature", and by always pointing West. An appropriate picture or logo would be printed on the face of the compass.

Another purpose of my invention is to supply an aid for worshippers of specific religions, who during their prayers need to face in a specific direction. For example, those of the Jewish faith are required to face Jerusalem three times each day while reciting their prayers. People who are outside of their homes or away from their normal house of worship are often in doubt as to the correct direction to face while praying.

An invention that attempts to fulfill this need is found in IL patent 103,686 to Hadar and Erez (1992). This invention is not in the compass, but rather is an invention that is comprised of an ordinary north-pointing compass, unchanged and readily available in any store. This generic compass of known type is set into a box with numbers ranging from 0–360 degrees surrounding the compass in a circular manner, and representing the lines of longitude of the globe. On this box in which the compass is attached, an arrow is painted. The difficulty in using this device, is that each time one wishes to find their direction of prayer, they need to a) hold the box, b) wait for the visible north-pointing needle to find magnetic north, c) then, manually rotate this box so that the geographic place of their origin, which is expressed in degrees of longitude, is opposite this north-pointing magnetic needle. Then they must look at the stationary painted arrow to see in which direction it is pointing. Each time that this device is put down, one must start all over again with the above steps in order to find their desired destination.

Since the above invention utilizes a regular north-pointing compass, it needs to be set into a box, which will contain all of the longitudal numbers on one side, and the names of the geographic destinations on the lid. This creates a very bulky mechanism to be carried from place to place. Also, since the compass it contains is of known type, always pointing north, one must follow all of the above steps as mentioned above in order to find their direction of prayer. The process that is required to operate this device may prove difficult for those worshippers who are less educated, and also prove to be inconvenient to others who will need to complete this process each and every time the device is handled. Also, it would be a great advantage to have a compass that has the added novelty of being magical and always pointing automatically in the direction that is considered to be holy by the worshippers and their religion. This would reaffirm their belief that the place of their prayers is truly holy, since their compass is compelled to point there automatically. The above device can not do this since it only displays a regular north-pointing compass.

Other types of compass inventions have been proposed to help locate the direction of prayer for Moslems who needs to face towards Mecca. For example, DE patent 3412777A1 to Haag (1985), CH patent 607904 to Kamoo (1978), EP patent 60814 to Benhardt (1982), and CH patent 613832 to Mozer (1979).

In each of the above patents, we find various embellishments on the generic north-pointing compass as cited above in the IL patent. In each case, the compass box must be manually rotated in order to align the north-pointing magnetic needle with the name or symbol of the person's geographic location. Also, all of these devices cannot apply the added novelty of magic, since they all contain a visible working north-pointing compass. My previous patent application U.S. Ser. No. 09/845,834 filed (May 1, 2001) to Ashin, and, abandoned in (2002), is enclosed here in this application.

Four more devices, U.S. Pat. No. 5,546,310 to Ehdaie et al (1996), U.S. Pat. No. 5,721,713 to Bornand (1998), U.S. Pat. No. 6,185,157 to Farine (2001), and U.S. Pat. No. 5,790,477 to Hauke (1998) are also used to locate Mecca or some other predetermined geographic location but, they all work via electronic circuitry and some of them utilize antennas. Also, they do not have any appearance to the generic compass of known type and therefore they are unable to provide the novelty of magic with regard to a normal compass. In addition, orthodox worshippers of the Jewish faith are forbidden to operate and even to handle electronic devices on their Sabbath (Saturday) and Holidays.

All of the above compass devices heretofore known, which are meant to locate a predetermined geographic locality for prayer, suffer from a number of disadvantages:

(a) They are all, (excluding the electronic devices), normal generic magnetic north-pointing compasses, thereby unable to supply the added novelty and advantage that "magic" is taking place. For worshippers of various religions who need a device for finding their place of prayer, these devices lack the mystic novelty that their compass is defying the laws of nature by pointing "magically" in the direction of their prayers.

(b) Their usage proves to be difficult. Each time they are handled, one must first find magnetic north, and then they must rotate the entire device until the north pointing magnetic needle is lined up with a name of town, symbol or some other geographic designation. Once this has been completed, the user must then look at a painted or some other stationery pointer to see in which direction to face for their prayers.

(c) Each and every time that one wishes to use the above devices, one must go through the entire three step process of holding, re-aligning, and then looking for the painted stationery pointer as stated above.

(d) Some of the devices need to be attached to a box-like structure or to have other replaceable parts available for carrying. These parts are meant to be interchangeable and necessary to help the locating process from a wider variety of geographic locations. This creates a bulky item, which proves to be difficult and uncomfortable to carry.

(e) The remaining devices used for locating predetermined geographic locations are not compasses but rather compass-like devices that operate through the usage of electronic circuitry and antennas. Besides not having the added advantage of operating in a magical way as stated above, but being electric, they are forbidden to be used and even handled by orthodox worshippers of the Jewish faith on their Sabbath (Saturday) and Holidays.

BACKGROUND OF INVENTION—OBJECTS AND ADVANTAGES

Accordingly, several objects and advantages of the present invention are:

(a) to provide a magic compass for worshippers of those faiths who need to face in a particular direction when praying. This compass has the appearance of a regular generic compass of known type, yet, instead of it's needle re-aligning with the magnetic north pole, it will re-align with the direction of the worshipper's prayers, adding a feeling of awe and enchantment to their compass, which appears to be defying the laws of nature due to the holiness of their direction of prayer.

(b) to provide a magic compass for worshippers to locate the direction of their prayers, which is easy to operate and functions like a normal compass thereby eliminating the need of rotating and realigning needles, and the need to use a stationary painted pointer as the compass needle.

(c) to provide a magic compass that functions like a normal generic compass, which when handled each and every time, will automatically find and point towards the geographic direction of one's prayers.

(d) to provide a magic compass that is not cumbersome and has no need for boxes or other additions. This will allow it to be small and light, and therefore easy to carry in one's pocket. It can be easily transported from place to place and even attachable to a key chain.

(e) to provide a magic compass for Jewish worshippers to locate the direction of Jerusalem for their three time daily prayers that is non-electric and therefore can also be used on their Sabbath and Holidays.

Further objects and advantages are to provide a magic compass which can be used by magicians to display the "art of magic" and "slight of hand technique" as is defined in the Webster's Dictionary. Also, to provide a very unique promotional device for companies and corporations that will attract attention to their company via a very novel item, and unlike the most common and prevalent promotional ink pen, it will never be "used up" and discarded. Also, to provide a unique device to create a new line of greeting cards for the billion dollar greeting card industry as well as a very new and unique souvenir to be sold in souvenir stores that are found in highway stops, museums and other tourist locations. Still further objects and advantages will become apparent from a consideration of the ensuing description and drawings.

SUMMARY

In accordance with the present invention a magic compass comprising a compass housing and a magnetized compass needle which is attached to a compass card. The needle and card are hidden by a partition, which is suspended above. A perforation in this partition allows the linkage of the magnetized needle to a non-magnetic pointer that is designed to resemble a true magnetic compass needle. This linkage will enable the non-magnetic pointer to freely pivot via the inertia of the magnetized compass needle hidden below.

DRAWINGS—FIGURES

FIG. 2 shows a fragmented perspective view providing a narrow lower chamber,

FIG. 3 shows a plan view of a second embodiment comprising a mechanism for the re-calibration of the non-magnetized pointer, FIG. 4 shows a sectioned detail of the second embodiment comprising a non-rigid linkage of the non-magnetic pointer to the magnetic needle,

DETAILED DESCRIPTION—FIGS. 1A,1B AND 2—PREFERRED EMBODIMENT

Figure 1A:
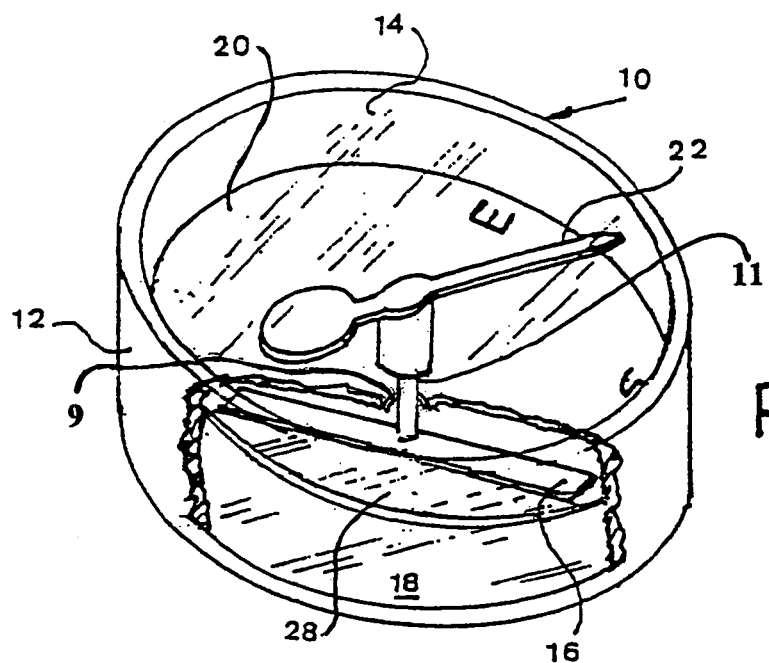
FIG. 1A shows a fragmented perspective view of a preferred embodiment of the compass according to the invention.
Figure 1B:
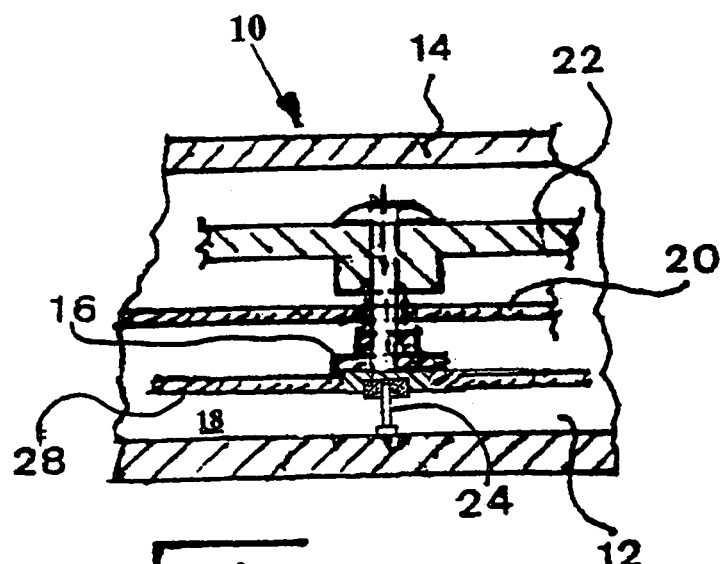
FIG. 1B shows a sectioned detail of the pivot shaft, and the partition separating the compass card assembly from the non-magnetic pointer.

A preferred embodiment of the magic compass of the present invention is illustrated in FIGS. 1A, 1B and FIG. 2. There is seen in FIG. 1A a compass of the type 10 having a non-transparent housing 12. Suitably the housing 12 can be made of a non-ferrous metal or a non-transparent plastic such as phenol. A transparent top face 14, which can suitably be made of a clear acrylic thermoplastic or glass, seals an open upper face of the housing 12.

A compass card assembly comprising a magnetized compass needle 16 and a compass card 28 is pivotally suspended on a pivot shaft 24 (FIG. 1B) in the lower section 18 of the housing 12. An opaque compass face 20 is positioned below the non-magnetic pointer 22, and above the magnetized compass needle 16. The magnetized needle 16 is attached via a linkage means 11 (FIG. 1A) to the non-magnetic pointer 22. The compass face 20 contains a perforation 9 at its center.

In FIG. 2, the compass 44 provides a distance between the compass face 46 and the housing top cover 48 to be at least twice the distance between the compass face 46 and the housing base 50. The magnetized compass needle 52 is angularly displaced from the non-magnetic pointer 54.

Operation—FIGS 1A,1B and 2—Preferred Embodiment

The magnetized compass needle 16 is attached, via a linkage means 11 to a non-magnetic pointer 22. This linkage consists of any means of fusing the non-magnetic pointer 22 to the magnetized needle 16 and compass card 28 below. The linkage 11 will provide a means for the pointer 22 to rotate and align itself freely via the inertia of the magnetized needle 16, which is pivotally supported on a pivot shaft 24 (FIG. 1B), thereby enabling the pointer 22 to function like a magnetized compass needle. Whether a simple pointed pivot shaft 24, as shown, is used, or a jewel bearing (not shown) is to support the magnetized needle 16 and the non-magnetic pointer 22, is merely a question of whether to market a low-cost or high quality device.

The pointer 22 is clearly visible through the transparent top face 14 of the housing 12, and is positioned in a plane parallel to the plane of the magnetized needle 16, and above the compass face 20. The pointer 22 is angularly displaced from the magnetized needle 16, whereby the non-magnetized pointer 22 always indicates a direction other than North. The angular displacement of the pointer is factory set depending upon the usage of the compass. For example, a magic compass to be manufactured as a promotional device to point South in the direction of the South Trust Bank, will have the pointer 22 displaced at 180 degrees from the north-pointing magnetized needle 16 hidden below.

By means of the linkage 11, the pointer 22 that will be shaped and designed concerning all aspects to provide an identical appearance to that of a magnetized compass needle 32 (FIG. 3) used in compasses of known type, will give the appearance that the compass is defying the laws of nature by not pointing North.

To further provide the appearance of magic, the opaque compass face 20 which is situated below the pointer 22, simultaneously serves as a partition, and in combination with the housing 12, hides the magnetized compass needle 16 and the compass card 28 from view. The partition 20 contains a circular perforation 9 at the circumferential center, having sufficient diameter to enable the non-magnetic pointer 22 to rotate freely without exposing the compass card 28 and magnetized needle 16 below.

In FIG. 2, an additional element is added to further increase the illusion of magic wherein the compass 44, provides a distance between the compass face 46 and the housing top cover 48 to be at least twice the distance between the compass face 46 and the housing base 50. For example, the distance between the compass face 46 and the housing top cover 48 is 10 mm, and the distance between the compass face 46 and the housing base 50 is 3 mm. By allocating only minimum space to the magnetized compass needle 52, detection thereof is unlikely and the user is perplexed by the action of the visible non-magnetized pointer 54 which indicates a direction other than North.

FIGS. 3 and 4—Second Embodiment

A second embodiment for my magic compass is shown in FIGS. 3 and 4. In FIG. 3, the compass 30 comprises two tensions springs 26 attached to the inside of the compass housing 12 and below the compass face 20. At the termination point of these springs 26, is attached a dampening material 15. Two buttons 13 protrude from the sides of the compass housing 12 and communicate with the springs 26. The non-magnetic pointer 32, which is visible through the transparent top face 14, is angularly displaced from the magnetized compass needle 34, which is hidden below the compass face 20. Indicia of 0–360 degrees 33 are arranged on the compass face 20. A connection ring 42 is available for attaching the compass to a key chain.

In FIG. 4, the compass 10, has a nodular dial 17 set into the transparent top face 14 and protrudes upwards. The terminating point 19 of the dial 17 is positioned inside of the compass housing 12 and above the non-magnetic pointer 22. The shaft 23 of the magnetic compass needle 16 protrudes above the compass face 20 and is inserted into the shaft 21 of the non-magnetic pointer 22 providing a non-rigid linkage 29 between the two. The compass card assembly which is comprised of the compass card 28 and the magnetized compass needle 16 pivot freely on the pivot support 24, thereby enabling the pointer 22 to freely pivot via the non-rigid linkage 29 that is formed by the union of shaft 21 of the pointer and shaft 23 of the magnetized needle. A predetermined demarcation 25 is visible on the shaft of the magnetized needle 23, just above the compass face 20.

Operation—FIGS. 3 and 4—Second Embodiment

In FIGS. 3 and 4, a second embodiment is provided, which will enable this magic compass to be used as a prayer aid, enabling users to find their direction of prayer anywhere in the world, and in a magical way.

In FIG. 3, the compass 30 contains two tension springs 26 which are attached to the inside of the compass housing 12, and hidden below the partition 20. These two springs 26 are positioned on either side of the compass card 28 and contain a dampening material 15. When the two springs 26 are activated, by pressing simultaneously on the two buttons 13, the communication of the buttons 13 with the springs 26 will cause the dampening material 15 to be brought into contact with the compass card 28, and will create friction to the card 28 holding it in place and thereby disabling its means to pivot.

In FIG. 4, the transparent top face 14 of the compass 10, contains a nodular dial 17. This dial 17 protrudes above the transparent top face 14. The bottom side of the dial 17 terminates into a predetermined shape 19, inside of the compass housing 12 and positioned above the non-magnetic pointer 22. Depressing dial 17 will cause its terminating point 19 of the dial 17 to engage with the top of the pointer 22.

The shaft 23 of the magnetized compass needle 16 is inserted into the shaft 21 of the non-magnetic pointer 22, forming a non-rigid linkage 29. When the dial 17 is turned the non-rigid linkage 29 will enable the pointer 22, above the partition 20, to be re-positioned clockwise or counter clockwise, thereby re-adjusting its relationship to the needle 16 below, which is temporarily being locked in place.

For example, if the user of this compass is situated in New York and he/she wishes to find Jerusalem as their location of prayer, they will depress the two buttons 13 found on either side of the compass housing 12, thereby bringing the two springs 26 with their dampening material 15, in contact with the compass card 28, which is hidden underneath the compass face 20. The card 28, and its shaft 23, being one unit, is no longer able to pivot freely on its pivot support 24, thereby allowing the user to turn the pointer 22 and its shaft 21 by depressing the nodular dial 17, thereby causing its termination point 19 to engage with the top of pointer 22. The dial 17 will be turned either clockwise or counter clockwise, thereby enabling the angular displacement of the pointer 22 to be adjusted.

It is important to point out that since the compass is constructed in a manner to completely hide the magnetized needle 16 and its compass card 28 underneath the opaque compass face 20, whereby the only visible moveable part is the pointer 22, the operator has no understanding of what he/she is doing by depressing and turning the buttons 13 below, and the dial 17 above. The operator will simply be instructed that just like a precision wrist watch must be re-set when traveling through time zones, so too this magic compass will continue to point in the direction of their prayers, but when traveling from one country to another, the compass needs to be re-set or re-calibrated. Once this process is done, the compass will continue to function accurately and precisely, always pivoting and re-aligning its non-magnetic pointer in the proper direction like a normal compass. The pointer 22 being designed to look like a real magnetized needle 32 (FIG. 3) will add to the perplexment of the user.

The user of this second embodiment of the magic compass will be supplied with a small index chart of world cities. This chart will be a small fold out easily inserted into a wallet for easy carrying and availability. Each significant city will be designated a number which will correspond with the 360 degrees of the compass face.

If one was traveling in England, and now they re-locate to New York, they will follow the above process of re-setting their magic compass, but they will not be aware that they are actually re-setting the angular displacement of the pointer 22 in relation to the hidden magnetized needle 16. The magic compass will be provided with a predetermined demarcation 25, which will be located on the shaft 23 of the magnetized compass needle 16. This demarcation 25 may consist of a colored dot or symbol. The demarcation 25 will always be aligned with the north-pointing magnetized compass needle 16, which is hidden below the compass face 20. This demarcation 25 will enable the user of the compass to unknowingly ascertain north thereby giving them a point of reference for allowing them to re-set the compass to the proper angular displacement. Since the angular displacement of a pre-destined location is in relationship to North, this demarcation 25 will provide this point of reference to the hidden north-pointing needle 16 hidden below.

For example, if the user of the magic compass arrives to New York from any previous destination, they will now be instructed to re-set their compass as they would a wrist watch when traveling through time zones. After removing their international city index form their wallet, they will see that for their magic compass to always point toward Jerusalem from New York, they will be required to set the pointer 22 to the number 98 degrees indicia found on the compass face 20. Using North as the reference point, and North being ("0") degrees 33 on the compass face 20, Jerusalem is approximately 98 degrees clockwise.

The user will now re-calibrate their magic compass by turning the compass until the "0" 33 on the compass face 20 is aligned with the demarcation 25. Unknowingly, the user has now ascertained North, and in a few seconds will finish the re-setting process. They will depress the two buttons 13 thereby activating the springs 26 to bring the dampening material 15 in contact with the compass card 28. The card 28 is now locked and will cease to pivot on its pivot shaft 24. This being done, the dial 17 in the transparent top face 14 will now be depressed, causing its termination point 19 to engage with the top of the pointer 22, thereby allowing the pointer 22 to be rotated clockwise or counter clockwise to number 98 degrees on the compass face 20. This completes the process of using the mechanisms in FIGS. 3 and 4 to re-set/re-calibrate the magic compass. Once this is done, the compass will automatically keep its bearing, always pointing in the direction of prayer.

Advantages

From the description above, a number of advantages of my magic compass become evident:

(a) For the worshippers of those faiths who need to find a particular direction when praying, they will be provided with a unique device which resembles and operates like a normal compass of known type, yet appears to defy the laws of nature by pointing in the direction of their prayers with accuracy, and with the added illusion of magic. This will give more meaning to their place of prayer as being so "holy" that even their compass is compelled to point in that special direction.

(b) This compass when used as an aid for locating the direction for prayer is easy to operate and due to its operation being similar to that of a normal compass, the need for rotating and re-aligning visible north-pointing needles before each and every usage is eliminated.

(c) Once this compass has its hidden angular displacement set, it will continue to function like a normal compass, which when handled each and every time will automatically find and point towards the geographic direction of one's prayers.

(d) There is no need for any type of box, container or other paraphernalia to enable this magic compass to operate, thereby allowing it to be small, light and easy to carry in one's pocket or on a key chain.

(e) This magic compass provides an aid for Jewish worshippers to locate the direction of Jerusalem for their three time daily prayers that is non-electric and therefore is permitted be used on their Sabbath and Holidays.

(f) In its most preferred embodiment, this magic compass provides a very unique and novel promotional device for companies and corporations that have the word South, East or West in their name, and is also superior to the logo ink pen normally used by companies, which provides no novelty, and when the ink runs out, it is usually discarded along with the company logo (g) Also, in its most preferred embodiment, this compass will be a most unique and superior souvenir, sold at museums, parks and places that have the word South, East or West in their name.

(h) Magicians will have another device to demonstrate the art of magic through their "slight of hand" technique by showing a normal north-pointing compass, and then exchanging it for one that is similar in appearance but is no longer pointing North.

(i) The greeting card industry will have an unusual item to incorporate into a new line of greeting cards.

CONCLUSION, RAMIFICATIONS, AND SCOPE

Accordingly, the reader will see that the magic compass of this invention can be incorporated into a wide spectrum of varied usages. As a prayer aid used to locate the direction for prayer, it provides a device that appears similar to a normal compass, which is easy to carry and easy to use, and requires no need for electricity. In addition, due to its illusion of defying the laws of nature, it provides an added feeling of awe and enchantment to the compass, which appears to be overcome by the holiness of the direction, and points in a direction contrary to nature. Furthermore, when the user is traveling from one country to another, and the non-magnetic pointer needs to be re-set, this process needs to be done only once for each new designation. This allows the compass to continue to function in an identical manner to a normal compass, which will always re-align with its one direction. Further advantages of this magic compass are that it provides a prayer aid to locate the direction for prayer that eliminates the need for re-aligning north pointing needles upon each and every usage and further eliminates the need for stationary arrows or other painted symbols as the pointer;

it provides a magic compass that can be used by magicians to demonstrate the art of magic via the "slight of hand technique";

it provides a strong and very novel promotional device for companies and corporations that will point in the global direction of their name, provide a usage to the client and not be "used up and discarded" as is the case with other promotional materials available today;

it provides a unique souvenir that always points in the global direction of the place visited;

it provides a novel item to be incorporated into a new line of greeting cards for the highly competitive greeting card industry;

Although the description above contains many specificities, these should not be construed as limiting the scope of the invention but as merely providing illustrations of some of the presently preferred embodiments of this invention. For example, other embodiments not described above include a compass without a partition, wherein the compass card pivoting on its shaft is visible. The magnetized needle can be hidden underneath the compass card as in the previous embodiment, but the non-magnetic needle would be attached to the top of the turning compass card. The top side of the pivoting card will simultaneously function as the compass face.

Another embodiment exists where one would be willing to compromise on the illusion of magic, and to have the non-magnetic pointer be a symbol or demarcation painted on the pivoting compass card. Also, in some devices, there is novelty where the workings of hidden mechanisms are exposed on purpose in order to provide a visual novelty. An example of this would be to construct the compass as mentioned in all of the embodiments of this application, where the compass housing is transparent thereby showing all of the mechanical workings of this unusual device.

There are many different ways of re-setting the compass' non-magnetic pointer in its relation to the magnetized needle below. For example, instead of using tension springs with a dampening material to hold the compass card in place, a lever could be used, which lifts the entire compass card assembly upwards and off of its pivot support, thereby bringing the non-magnetic pointer into contact with the dial assembly. By doing this, the compass card is not able to pivot, and thereby simultaneously enables the non-magnetic pointer to brought into contact with the dial assembly of the transparent top face. The user merely needs to turn the dial, and then release the lever thereby returning the entire compass card assembly to its pivot support. This embodiment would allow for the magnetic compass needle to rotate freely, and without the need for the compass card. In another embodiment the dial, which is set into the top of the compass, can be an integral part of the top face whereby the top face is rotate able.

Yet another embodiment would allow for the top face to be opened thereby allowing the non-magnetic pointer to be re-set manually by hand. These are just a few varied ways of performing the re-calibration process, which consists of holding the compass card and turning the non-magnetic needle, etc.

Thus the scope of the invention should be determined by the appended claims and their legal equivalents, rather than by the examples given.

I claim:

1. A compass of the type comprising a housing, a magnetized compass needle pivotally supported on a pivot shaft within said housing, said compass having a transparent top face,
   wherein said magnetized compass needle is attached, via a linking means, to a non-magnetic pointer positioned in a plane above and parallel to the plane of said magnetized compass needle below, and angularly displaced from said magnetized compass needle,
   thereby providing a means for causing said non-magnetic pointer to rotate and align itself responsively to inertia of said magnetized compass needle below, while maintaining an angular displacement of said pointer relative to said magnetized compass needle,
   said compass further containing a means for re-positioning said angular displacement of said non-magnetic pointer, in relation to said magnetized compass needle below.

2. The compass according to claim 1 wherein said means for repositioning said angular displacement is comprised of two tension springs attached to the inside of said compass housing, a compass card, and a nodular dial built into the transparent top face of said compass and positioned above said non-magnetic pointer.

3. The compass according to claim 2 wherein one of said tension springs is positioned on one side of said compass card, and another of said tension springs is positioned on another side of said compass card, said tension springs further containing a dampener pad, said dampener pad being attached to termination points of said tension springs, whereby activation of said springs will bring said dampener pads in contact with said compass card, creating function against said compass card, holding said card in place, and enabling said nodular dial to engage with said nonmagnetic pointer, thereby enabling the re-positioning of angular displacement of said pointer in relation to the magnetic compass needle.

4. The compass according to claim 1 further including a partition wherein said partition contains a circular perforation at a circumferential center thereof, said partition being positioned above said magnetized compass needle, hiding said needle from view and thereby simultaneously providing a compass face for said non-magnetic pointer.

5. The compass according to claim 4 wherein the size of said perforation in said partition is sufficient in diameter to enable said non-magnetic pointer to rotate freely without exposing said magnetized compass needle.

6. The compass according to claim 4 wherein said compass face contains indicia in reference to 360 degrees of said compass face.

7. A method of enabling a magnetic north-pointing compass of known type to operate in a magical manner, comprising the steps of:
   (a) providing a magnetic compass of known type comprising a housing, a magnetized compass needle pivoting on a pivot shaft, and a transparent top face,
   (b) linking a non-magnetic pointer to said magnetized compass needle,
   (c) providing a partition to separate said non-magnetic pointer from said magnetized compass needle, hiding same from view while simultaneously providing a compass face for said non-magnetic pointer above,
   (d) whereby said non-magnetic pointer is positioned in a plane above and parallel to the plane of said magnetized compass needle, and angularly displaced from said magnetized compass needle, thereby providing a means for said non-magnetic pointer to rotate and align itself freely via the inertia of said magnetized compass needle below,
   (e) further providing a means for re-positioning said angular displacement of said non-magnetic pointer above said partition, in relation to said magnetized compass needle below said partition.

8. The method of claim 7 wherein said means is comprised of two tension springs attached to the inside of said compass housing and below said partition, a compass card, and a nodular dial built into the transparent top face of said compass and positioned above said non-magnetic pointer.

9. The method according to claim 8 wherein said partition contains a circular perforation at a circumferential center thereof.

10. The method according to claim 9 wherein the size of said perforation in said partition is sufficient in diameter to enable said magnetic pointer to rotate freely without exposing said compass card below.

11. The method of claim 7 wherein said compass face contains indicia in reference to 360 degrees of said compass face.

12. The method of claim 7 wherein said step of linking non-magnetic pointer to said magnetized compass needle is performed non-rigidly.

* * * * *